US012609257B2

(12) United States Patent
Fanta

(10) Patent No.: US 12,609,257 B2
(45) Date of Patent: Apr. 21, 2026

(54) AUTOMATIC DROP-OUT AND RESET OF A VACUUM INTERRUPTER DEVICE IN A CUTOUT MOUNTING

(71) Applicant: S&C Electric Company, Chicago, IL (US)

(72) Inventor: Thomas Olin Fanta, Wauconda, IL (US)

(73) Assignee: S&C Electric Company, Chicago, IL (US)

( * ) Notice: Subject to any disclaimer, the term of this patent is extended or adjusted under 35 U.S.C. 154(b) by 260 days.

(21) Appl. No.: 18/483,135

(22) Filed: Oct. 9, 2023

(65) Prior Publication Data

US 2024/0120164 A1 Apr. 11, 2024

Related U.S. Application Data

(60) Provisional application No. 63/415,186, filed on Oct. 11, 2022.

(51) Int. Cl.
*H01H 33/666* (2006.01)
*H01H 3/30* (2006.01)

(52) U.S. Cl.
CPC ...... *H01H 33/6664* (2013.01); *H01H 3/3015* (2013.01)

(58) Field of Classification Search
CPC .. H01H 33/6664; H01H 3/3015; H01H 75/04; H01H 75/02; H01H 75/00; H01H 77/00; H01H 77/02; H01H 2221/03; H01H 2223/018; H01H 2223/01; H01H 5/00; H01H 3/54; H01H 3/02
USPC .......................................................... 200/400
See application file for complete search history.

(56) References Cited

U.S. PATENT DOCUMENTS 6,687,110 B2 * 2/2004 Murray .............. H01H 33/6661 361/131

* cited by examiner

*Primary Examiner* — Anthony R Jimenez

(57) ABSTRACT

An actuation assembly that is part of and operates to open and close a cut-out mounted switching device. The actuation assembly includes components that cause the switching device to be released from an upper coupling assembly when the actuation assembly opens the switching device and causes the switching device to be closed when the switching device is dropping out of the coupling assembly.

20 Claims, 4 Drawing Sheets

AUTOMATIC DROP-OUT AND RESET OF A VACUUM INTERRUPTER DEVICE IN A CUTOUT MOUNTING

CROSS-REFERENCE TO RELATED APPLICATION

This application claims the benefit of priority from the U.S. Provisional Application No. 63/415,186, filed on Oct. 11, 2022, the disclosure of which is hereby expressly incorporated herein by reference for all purposes.

BACKGROUND

Field

This disclosure relates generally to an actuation assembly that is part of and operates to open and close a switching device and, more particularly, to an actuation assembly that is part of and operates to open and close a cut-out mounted switching device.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three phase feeders including three single phase feeder lines that carry the same current, but are 120° apart in phase. A number of three phase and single phase lateral lines are tapped off of the feeder that provide the medium voltage to various distribution transformers, where the voltage is stepped down to a low voltage and is provided to a number of loads, such as homes, businesses, etc. Power distribution networks of the type referred to above typically include a number of switching devices, breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Traditionally, a fuse is employed as a primary overload protection device for protecting distribution transformers and other devices that has a certain rating so that the fuse will operate above a transformer inrush current, but below a transformer through fault protection withstand or damage curve. However, fuses often create an arc when they operate, which has obvious dangers and drawbacks. It has become increasingly popular to replace the traditional fuse with a cutout-mounted fault interrupting device that employs a vacuum interrupter and a magnetic actuator to operate the vacuum interrupter. A vacuum interrupter is a switch that employs opposing contacts, one fixed and one movable, positioned within a vacuum enclosure. When the vacuum interrupter is opened by operating the magnetic actuator to move the movable contact away from the fixed contact to prevent current flow through the interrupter a plasma arc is created between the contacts that is contained and quickly extinguished by the vacuum at the next zero current crossing. When fault current is detected by the device the vacuum interrupter is opened and the device is released or "drops out" from its mounting indicating that it has operated.

The dropout feature of a cut-out mounted vacuum interrupting device requires a magnetic actuator to initiate the dropout operation, which adds significant cost to the device. After a dropout operation the device needs to be reset by closing the vacuum interrupter and charging opening and compliance springs in the magnetic actuator. One known device resets by tripping the device closed just after the dropout operation. Another known device resets by harvesting energy with a high voltage resistor assembly and automatically closing the magnetic actuator when the device replaced into the mounting. Both of these techniques require storing enough electrical energy in a large capacitor to close the vacuum interrupter and reset the device.

SUMMARY

The following discussion discloses and describes an actuation assembly that is part of and operates to open and close a switching device. The switching device includes a switch coupled to a first coupling assembly and the actuation assembly through a drive linkage, where the actuation assembly is rotatably coupled to a second coupling assembly. The actuation assembly includes an actuator, opposing plates defining a space therebetween and being coupled to the actuator, and a dropout lever rigidly coupled to the second coupling assembly and positioned between the opposing plates. The dropout lever includes opposing dropout arms defining a space therebetween, a first cam coupled to one of the dropout arms in the space and a second cam coupled to the other dropout arm in the space. A drive rod is coupled to the drive linkage and the actuator that extends between the first and second cams, where the drive rod includes a flange. A release lever is pivotally coupled to the opposing side plates and engages the flange. A latching lever is pivotally coupled to one of the dropout arms opposite to the second coupling assembly at one end. A trip link including a slot is rigidly coupled to the release lever at one end, where an end of the latching lever opposite to the dropout arm is slidable in the slot. A spring link is coupled to the release lever at one end and one end of a spring at an opposite end, where the spring is coupled to one of the plates at an opposite end. Actuation of the actuator to open the switch causes the drive rod with the flange to move, which causes the release lever to rotate under bias of the spring, which pulls on the trip link and causes the latching lever to slide in the slot and causes ends of the dropout arms opposite to the second coupling assembly to be pulled, which disengages the switch from the first coupling assembly and allows the switch to rotate on the second coupling assembly. A compliance stop is secured to the drive rod and the second coupling assembly includes a rotation stop. Drop out and rotation of the switch eventually causes the dropout lever to engage the rotation stop, but allows the switch to continue rotating, which causes the compliance stop to engage the first and second cams, which causes the release lever, the trip link, the latching lever and the dropout arms to return to the switch closed position.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an actuation assembly that is part of and operates to open and close a switching device is merely exemplary in nature, and is in no way intended to limit the disclosure or its applications or uses.

Figure 1:
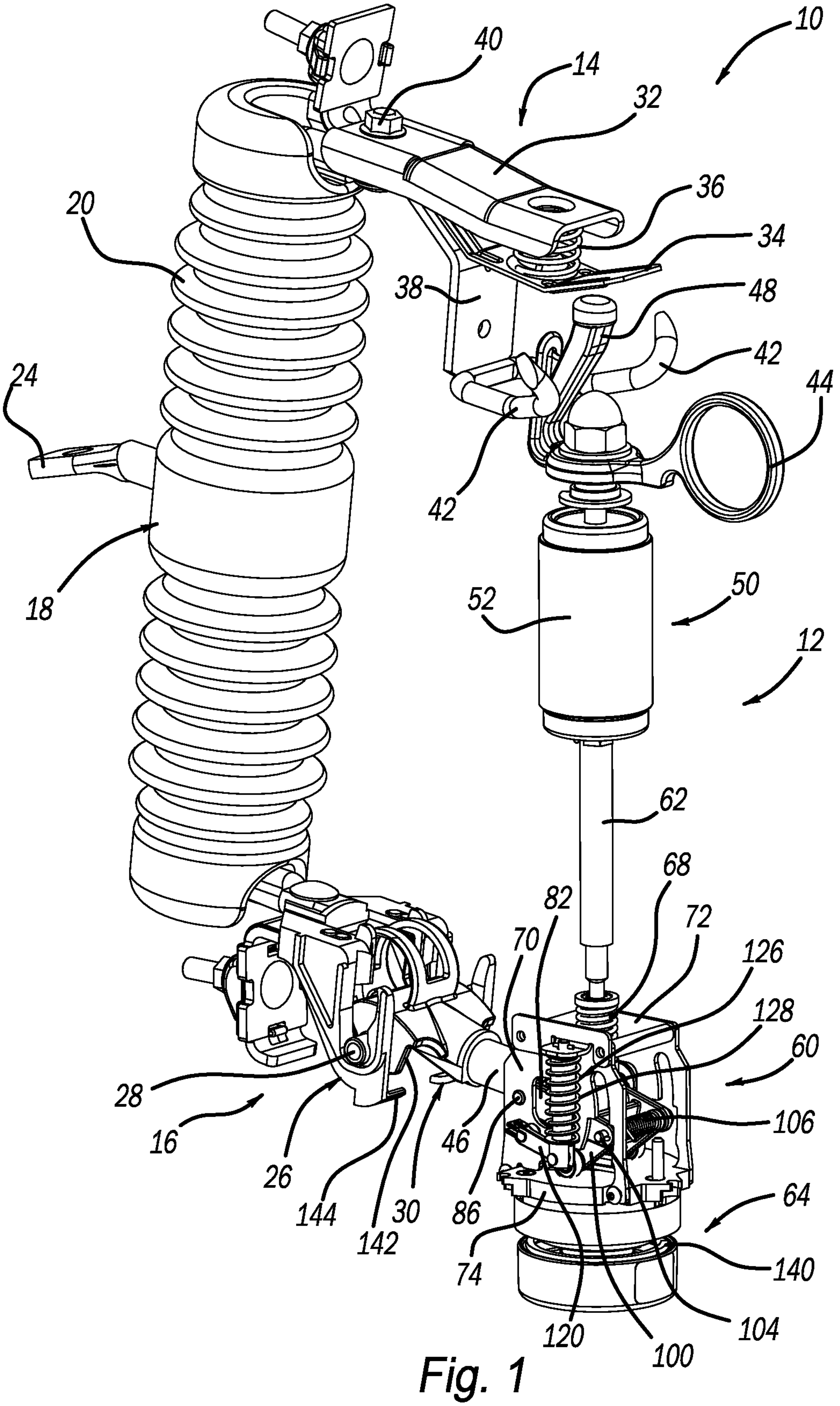
FIG. 1 is an isometric view of a switch assembly connected to a pole mounted insulator and including a magnetically actuated cut-out mounted switching device having a vacuum interrupter.

FIG. 1 is an isometric view of a pole mounted switch assembly 10 including a switching device 12, where an outer housing of the switching device 12 has been removed to expose the inner components. The switching device 12 is coupled to an upper coupling assembly 14 at a top end and a lower coupling assembly 16 at a bottom end. The upper assembly 14 is secured to one end of an insulator 18 having skirts 20 and the lower assembly 16 is secured to an opposite end of the insulator 18, where the insulator 18 is mounted to a bracket 24 that may be attached to a utility pole (not shown). The lower assembly 16 includes a cutout hinge 26 that accepts a pivot rod 28 on a trunnion assembly 30 having a trunnion 46 coupled to the device 12 and that is electrically coupled to a unit bottom contact (not shown). The upper assembly 14 includes a top mounting tab 32, an extension tab 34 and a spring 36 positioned between the tabs 32 and 34. The upper assembly 14 also includes a support tab 38 bolted to the mounting tab 32 by a bolt 40 and a pair of mounting horns 42 coupled to and extending from the support tab 38 opposite to the extension tab 34. A unit top contact 48 is positioned between the horns 42 and engages the tab 34 against the bias of the spring 36 to hold the switching device 12 in the upper assembly 14. A guiding pull ring member 44 is coupled to a top of the device 12 and allows a worker to easily remove the device 12 from the utility pole by pulling on the ring member 44 to disengage the contact 48 from the upper assembly 14, rotating the device 12 outward on the pivot rod 28 and then lifting the device 12 out of the hinge 26. FIG. 1 shows the unit top contact 48 just being released from the upper assembly 14.

The switching device 12 includes a vacuum interrupter 50 having an outer insulation housing 52, where the vacuum interrupter 50 is representative of any vacuum interrupter known in the art for medium voltage uses that is suitable for the purposes discussed herein. The vacuum interrupter 50 includes a vacuum chamber that encloses a fixed contact that is electrically coupled to the unit top contact 48 and a movable contact that is electrically coupled to the unit bottom contact, where the fixed and movable contacts are in contact with each other within the vacuum chamber when the vacuum interrupter 50 is closed. When the vacuum interrupter 50 is opened by moving the movable contact away from the fixed contact the arc that is created between the contacts is extinguished by the vacuum at a zero current crossing. The switching device 12 also includes an actuation assembly 60 that is coupled to the vacuum interrupter 50 by a drive linkage 62 and having a magnetic actuator 64. A compliance spring 68 sitting on a compliance spring stop 58 holds the vacuum interrupter contacts closed during operation.

Figure 2:
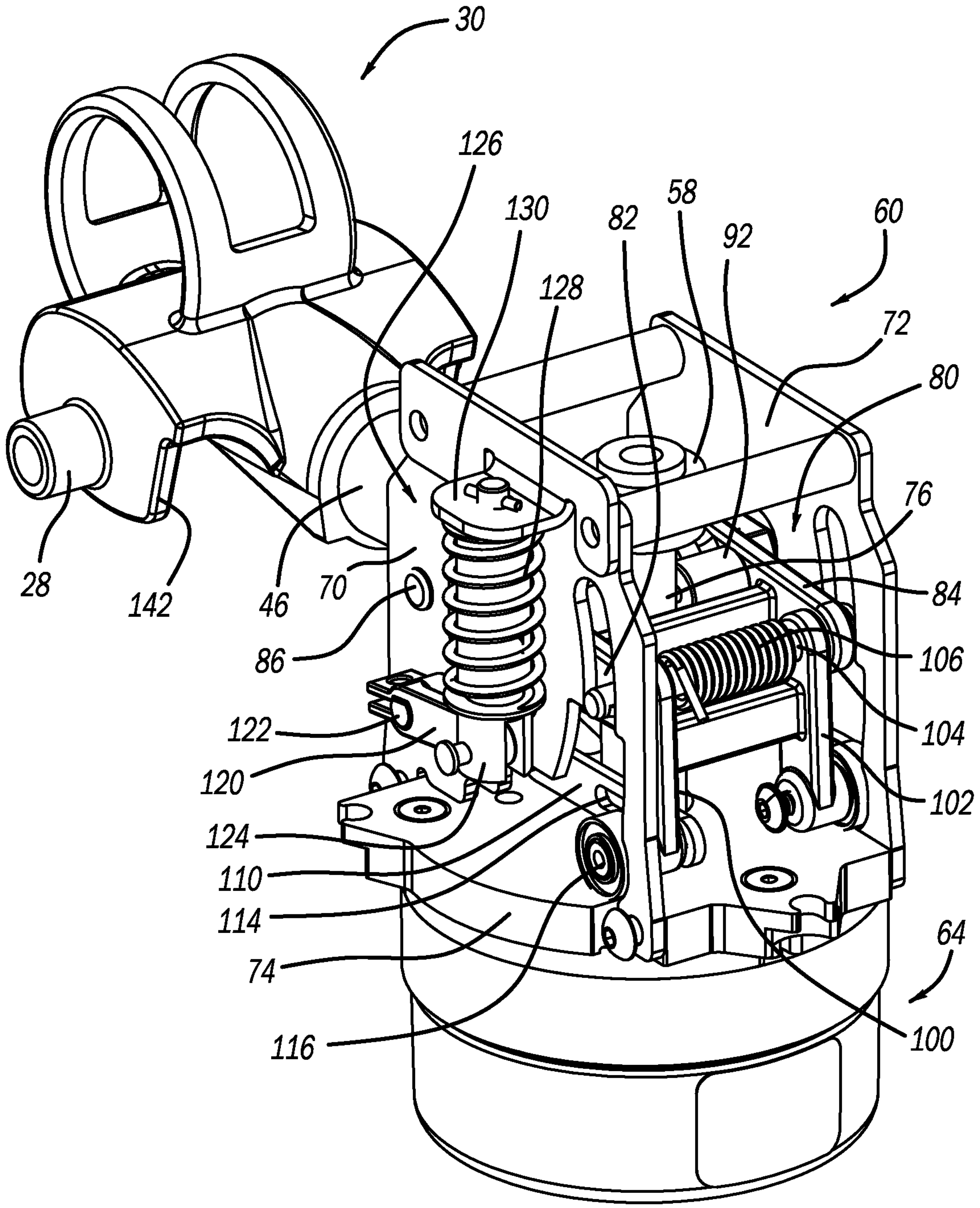
FIG. 2 is an isometric view of an actuation assembly and trunnion assembly separated from the switching device with the switching device in the closed position.
Figure 3:
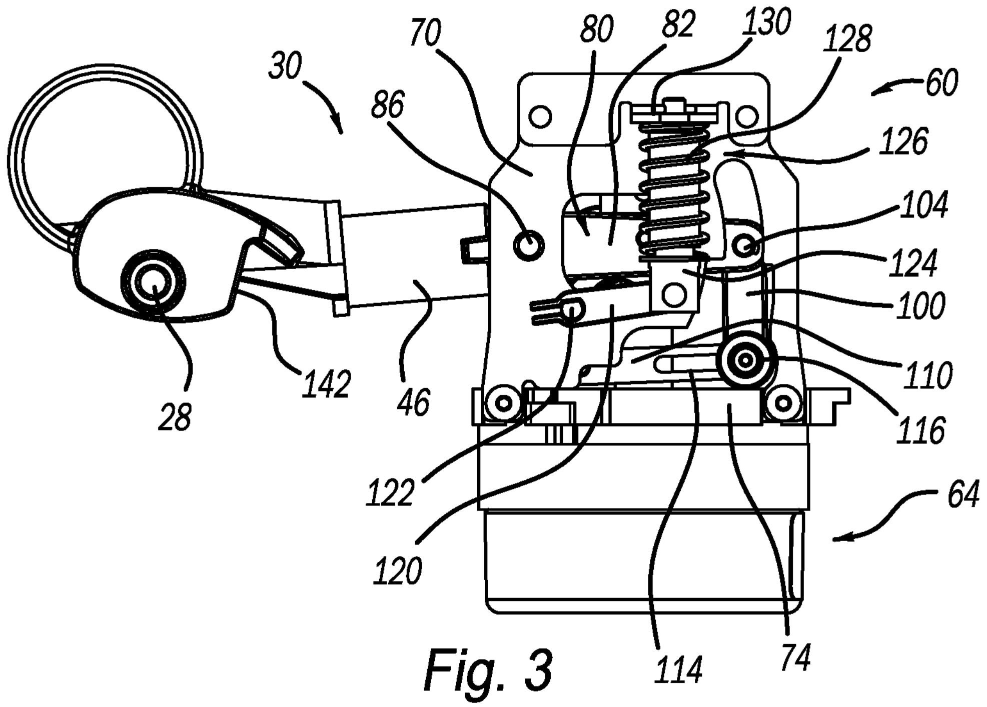
FIG. 3 is a side view of the actuation assembly and trunnion assembly separated from the switching device with the switching device in the closed position.
Figure 4:
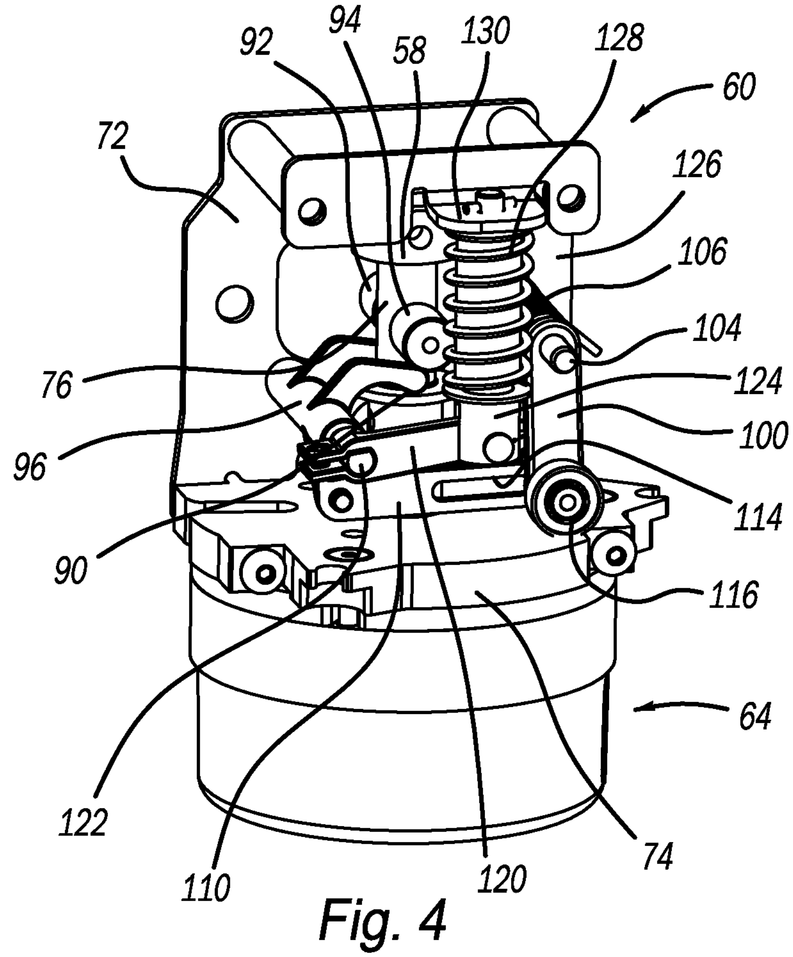
FIG. 4 is a broken-away isometric view of the actuation assembly separated from the switching device with the switching device in the closed position.
Figure 5:
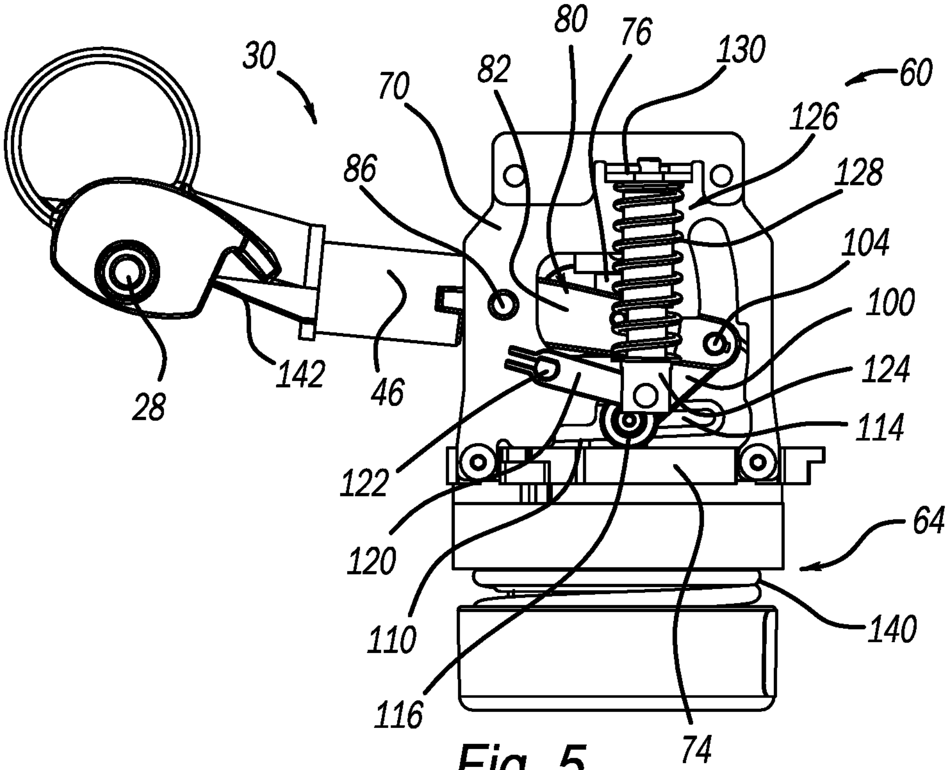
FIG. 5 is a side view of the actuation assembly and trunnion assembly separated from the switching device with the switching device in the open position.
Figure 6:
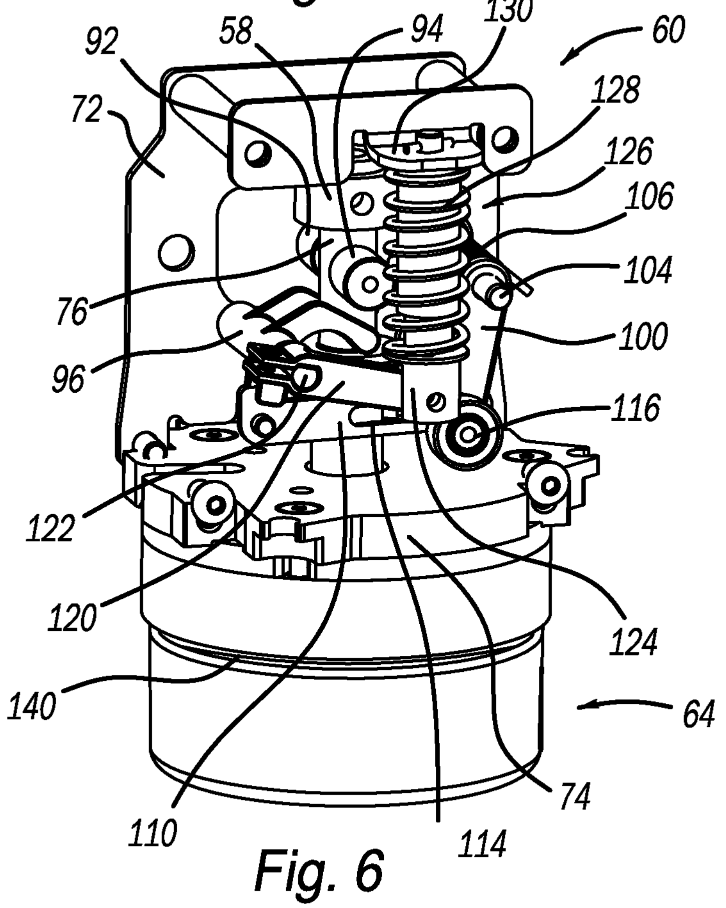
FIG. 6 is a broken-away isometric view of the actuation assembly separated from the switching device with the switching device in the open position.

As will be discussed in detail below, operation or opening of the vacuum interrupter 50 in response to fault current automatically causes the contact 48 to be released from the upper assembly 14 so that the switching device 12 rotates on the rod 28 under the force of gravity to a dropout position. As the switching device 12 is rotating on the rod 28, the vacuum interrupter 50 is automatically closed and ready to be reconnected to the upper assembly 14. FIG. 2 is an isometric view of the actuation assembly 60 and the trunnion assembly 30 separated from the switching device 12 with the switching device 12 in the closed position; FIG. 3 is a side view of the actuation assembly 60 and the trunnion assembly 30 separated from the switching device 12 with the switching device 12 in the closed position; FIG. 4 is a broken-away isometric view of the actuation assembly 60 separated from the switching device 12 with the switching device 12 in the closed position, where some of the components have been removed for clarity; FIG. 5 is a side view of the actuation assembly 60 and the trunnion assembly 30 separated from the switching device 12 with the switching device 12 in the open position; and FIG. 6 is a broken-away isometric view of the actuation assembly 60 separated from the switching device 12 with the switching device 12 in the open position, where some of the components have been removed for clarity.

The actuation assembly 60 includes opposing side plates 70 and 72 mounted to a support plate 74 through which a drive rod 76 coupled to the drive linkage 62 extends. A U-shaped dropout lever 80 having opposing arms 82 and 84 is coupled to the trunnion 46 and is pivotable on a pivot pin 86 secured to the side plates 70 and 72. A flange 90 is provided on the drive rod 76 and a pair of dropout lever cams 92 and 94 are coupled to the arms 82 and 84, respectively, and are close to or in contact with the drive rod 76. A release lever 96 is pivotally mounted to the side plates 70 and 72 and engages the flange 90. A pair of latching levers 100 and 102 are pivotally coupled to a rod 104 secured to the arms 82 and 84 opposite to the trunnion 46, where a spring 106 is wound around the rod 104. The latching levers 100 and 102 are in a toggle state when the vacuum interrupter 50 is in the closed position. A trip link 110 including a slot 114 is coupled to the release lever 96 at one end and a rod 116 at an opposite end, where the latching levers 100 and 102 are also coupled to the rod 116 opposite the rod 104. A spring link 120 is coupled to a pin 122 on the release lever 96 outside of the side plate 70 at one end and an end piece 124 of a spring dampener 126 at an opposite end, where the dampener 126 supports a spring 128 positioned between the end piece 124 and a tab 130 secured to the side plate 70.

During operation, the unit top contact 48 is engaged with the upper assembly 14 and the components in the actuation assembly 60 are configured as shown in FIGS. 2, 3 and 4. In this non-limiting design, when the actuator 64 is controlled to close the vacuum interrupter 50, an actuator winding (not shown) is energized by current flow in one direction, which causes a plunger (not shown) coupled to the drive rod 76 to move and seat against a latching plate (not shown) against the bias of an opening spring 140. The winding is then de-energized and permanent magnets (not shown) hold the plunger against the latching plate and against a compression force of the opening spring 140. When the actuator 64 is controlled to open the vacuum interrupter 50 in response to, for example, fault current, the winding is energized by current flow in the opposite direction, which breaks the latching force of the permanent magnets and allows the opening spring 140 to pull the drive rod 76 and the drive linkage 62 down and open the vacuum interrupter 50. When the drive rod 76 moves down so does the flange 90, which allows the release lever 96 to rotate clockwise with the bias of the spring 126 through the spring link 120, where the dampener 124 provides a delay, such as 50 msec, for rotating the lever 96. When the release lever 96 rotates it pulls the trip link 110, which pulls the latching levers 100 and 102 out of the toggle state and allows the rod 116 to slide in the slot 114. The ends of the arms 82 and 84 opposite to the trunnion 46 are pulled down on the pivot pin 86, which allows the switching device 12 and the top contact 48 to move down and disengaged from the upper assembly 14 to allow the switching device 12 to pivot on the rod 28 and drop out under the force of gravity.

When the trunnion assembly 30 is rotating on the pivot rod 28 a trunnion stop 142 on the trunnion assembly 30 will eventually engage a hinge stop 144 on the cutout hinge 26, which stops the trunnion 46 and thus the drop out lever 80 from further rotation. However, because the switching device 12 is secured to the trunnion 46 through the pivot pin 86, the moving mass of the switching device 12 causes it to continue rotating. As the drive rod 76 continues to move relative to the dropout lever 80, the compliance spring stop 58 will eventually be driven into the cams 92 and 94. This causes the drive rod 76 to be driven towards the vacuum interrupter closed position, previously upward, but sideways now because the switching device 12 has dropped out, against the bias of the opening spring 140. When the vacuum interrupter contacts engage each other, the permanent magnets latch the vacuum interrupter 50 in the closed position, where the opening spring 140 and the compliance spring 68 are now in the charged position. Further, the release lever 96 is rotated in a counter-clockwise direction, the latching levers 100 and 102 are returned to the toggle state and the spring 126 is charged. The switching device 12 can then be re-engaged with the upper assembly 14 using the ring 44.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An actuation assembly that is part of and operates to open and close a switching device, the switching device including a switch coupled to a first coupling assembly and to the actuation assembly through a drive linkage, the actuation assembly being rotatably coupled to a second coupling assembly, the actuation assembly comprising:

an actuator;

opposing side plates defining a space therebetween and being coupled to the actuator;

a dropout lever rigidly coupled to the second coupling assembly and positioned between the opposing side plates, the dropout lever including opposing dropout arms defining a space therebetween, a first cam coupled to one of the opposing dropout arms in the space and a second cam coupled to the other of the opposing dropout arms in the space;

a drive rod coupled to the drive linkage and the actuator and extending between the first and second cams, the drive rod including a flange;

a release lever pivotally coupled to the opposing side plates and engaging the flange;

a latching lever pivotally coupled to one of the opposing dropout arms opposite to the second coupling assembly at one end;

a trip link including a slot rigidly coupled to the release lever at one end, wherein an end of the latching lever opposite to the coupled opposing dropout arm is slidable in the slot; and a spring link coupled to the release lever at one end and one end of a spring at an opposite end, the spring being coupled to one of the plates at an opposite end, wherein actuation of the actuator to open the switch causes the drive rod and the flange to move, causes the release lever to rotate under bias of the spring, which pulls on the trip link and causes the latching lever to slide in the slot and causes ends of the opposing dropout arms opposite to the second coupling assembly to be pulled, which disengages the switching device from the first coupling assembly and allows the switching device to rotate on the second coupling assembly.

2. The actuation assembly according to claim 1 further comprising a compliance stop secured to the drive rod, wherein the second coupling assembly includes a rotation stop, and wherein rotation of the switching device eventually causes the dropout lever to engage the rotation stop but allows the switching device to continue rotating, which causes the compliance stop to engage the first and second cams, which causes the release lever, the trip link, the latching lever and the dropout arms to return to a switch closed position.

3. The actuation assembly according to claim 1 wherein the spring is part of a dampener assembly that delays movement of the release lever in response to movement of the drive rod.

4. The actuation assembly according to claim 1 wherein the switch is a vacuum interrupter and the actuator is a magnetic actuator.

5. The actuation assembly according to claim 4 wherein the switching device is a cut-out mounted fault current interrupting device on a utility pole.

6. A cut-out mounted switching device configured to be coupled to a first coupling assembly and a second coupling assembly, the device comprising:

a drive linkage;

a vacuum interrupter coupled to the drive linkage and the first coupling assembly; and an actuation assembly being coupled to the drive linkage and being rotatably coupled to the second coupling assembly, the actuation assembly including a magnetic actuator and components that cause the switching device to be released from the first coupling assembly when the actuation assembly opens the switching device and causes the switching device to be closed when the switching device is dropping out of the first coupling assembly.

7. The switching device according to claim 6 wherein the components in the actuation assembly include opposing side plates defining a space therebetween and being coupled to the actuator, a dropout lever rigidly coupled to the second coupling assembly and positioned between the opposing side plates, the dropout lever including opposing dropout arms defining a space therebetween, a first cam coupled to one of the dropout arms in the space and a second cam coupled to the other dropout arm in the space, a drive rod coupled to the drive linkage and the actuator and extending between the first and second cams, the drive rod including a flange, a release lever pivotally coupled to the opposing side plates and engaging the flange, a latching lever pivotally coupled to one of the dropout arms opposite to the second coupling assembly at one end, a trip link including a slot rigidly coupled to the release lever at one end, wherein an end of the latching lever opposite to the dropout arm is slidable in the slot, and a spring link coupled to the release lever at one end and one end of a spring at an opposite end, the spring being coupled to one of the plates at an opposite end, wherein actuation of the actuator to open the vacuum interrupter causes the drive rod and the flange to move, causes the release lever to rotate under bias of the spring, which pulls on the trip link and causes the latching lever to slide in the slot and causes ends of the dropout arms opposite to the second coupling assembly to be pulled, which disengages the switching device from the first coupling assembly and allows the switching device to rotate on the second coupling assembly.

8. The switching device according to claim 7 wherein the components in the actuation assembly further include a compliance stop secured to the drive rod, wherein the second coupling assembly includes a rotation stop, and wherein rotation of the switching device eventually causes the dropout lever to engage the rotation stop but allows the switching device to continue rotating, which causes the compliance stop to engage the first and second cams, which causes the release lever, the trip link, the latching lever and the dropout arms to return to the switch closed position.

9. The switching device according to claim 7 wherein the spring is part of a dampener assembly that delays movement of the release lever in response to movement of the drive rod.

10. An actuation assembly that is part of and operates to open and close a cut-out mounted switching device, the switching device including a switch coupled to a first coupling assembly and the actuation assembly through a drive linkage, the actuation assembly being rotatably coupled to a second coupling assembly, the actuation assembly comprising an actuator and components that cause the switching device to be released from the first coupling assembly when the actuation assembly opens the switching device and causes the switching device to be closed when the switching device is dropping out of the first coupling assembly.

11. The actuation assembly according to claim 10 wherein the switch is a vacuum interrupter and the actuator is a magnetic actuator.

12. The actuation assembly according to claim 11 wherein the switching device is a cut-out mounted fault current interrupting device on a utility pole.

13. The actuation assembly according to claim 10 wherein the components include opposing plates defining a space therebetween and being coupled to the actuator and a dropout lever rigidly coupled to the second coupling assembly and positioned between the opposing plates, the dropout lever including opposing dropout arms defining a space therebetween, a first cam coupled to one of the dropout arms in the space and a second cam coupled to the other dropout arm in the space.

14. The actuation assembly according to claim 13 wherein the components further include a drive rod coupled to the drive linkage and the actuator and extending between the first and second cams, the drive rod including a flange.

15. The actuation assembly according to claim 14 wherein the components further include a release lever pivotally coupled to the opposing side plates and engaging the flange.

16. The actuation assembly according to claim 15 wherein the components further include a latching lever pivotally coupled to one of the dropout arms opposite to the second coupling assembly at one end.

17. The actuation assembly according to claim 16 wherein the components further include a trip link having a slot rigidly coupled to the release lever at one end, wherein an end of the latching lever opposite to the dropout arm is slidable in the slot.

18. The actuation assembly according to claim 17 wherein the components further include a spring link coupled to the release lever at one end and one end of a spring at an opposite end, the spring being coupled to one of the plates at an opposite end, wherein actuation of the actuator to open the switch causes the drive rod and the flange to move, causes the release lever to rotate under bias of the spring, which pulls on the trip link and causes the latching lever to slide in the slot and causes ends of the dropout arms opposite to the second coupling assembly to be pulled, which disengages the switching device from the first coupling assembly and allows the switching device to rotate on the second coupling assembly.

19. The actuation assembly according to claim 18 wherein the components further include a compliance stop secured to the drive rod, wherein the second coupling assembly includes a rotation stop, and wherein rotation of the switch eventually causes the dropout lever to engage the rotation stop but allows the switch to continue rotating, which causes the compliance stop to engage the first and second cams, which causes the release lever, the trip link, the latching lever and the dropout arms to return to the switch closed position.

20. The actuation assembly according to claim 18 wherein the spring is part of a dampener assembly that delays movement of the release lever in response to movement of the drive rod.

* * * * *